US007747663B2

(12) United States Patent
Atkin et al.

(10) Patent No.: US 7,747,663 B2
(45) Date of Patent: Jun. 29, 2010

(54) SYSTEM AND METHOD FOR CONTENT ADDRESSABLE STORAGE

(75) Inventors: Benjamin Atkin, New York, NY (US); Grzegorz Calkowski, Hopewell, NJ (US); Cristian Ungureanu, Princeton, NJ (US); Cezary Dubnicki, Monmouth Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 374 days.

(21) Appl. No.: 12/042,777

(22) Filed: Mar. 5, 2008

(65) Prior Publication Data

US 2009/0228511 A1    Sep. 10, 2009

(51) Int. Cl.
*G06F 17/30* (2006.01)
(52) U.S. Cl. .................................. 707/822; 707/648
(58) Field of Classification Search ................. 707/648, 707/822, 999.201
See application file for complete search history.

(56) References Cited

U.S. PATENT DOCUMENTS

| 7,010,721 | B2 * | 3/2006 | Vincent | 714/20 |
| 7,133,963 | B2 * | 11/2006 | Gilfix et al. | 711/108 |
| 7,415,731 | B2 * | 8/2008 | Carpentier et al. | 726/30 |
| 7,653,832 | B2 * | 1/2010 | Faibish et al. | 714/7 |
| 7,676,514 | B2 * | 3/2010 | Faibish et al. | 707/646 |
| 2005/0071593 | A1 * | 3/2005 | Vincent | 711/165 |

OTHER PUBLICATIONS

Abd-El-Malek, M., et al., "Ursa-Minor: Versatile Cluster-Based Storage", Proceedings 4th USENIX Conf. on FAST 2005, Dec. 2005.
Cluster File Systems, Inc., "Lustre: A Scalable, High-Performance File System", Nov. 2002.
Cox, L. P., et al., "Pastiche: Making Backup Cheap and Easy", Proceedings 5th USENIX Symp. OSDI, Dec. 2002.
Dubnicki, C., et al., "FPN: A Distributed Hash Table for Commercial Applications", Procceedings 13th Int'l. Symp. HPDC, p. 120-128, Jun. 2004.
Ganger, G. R., et al., "Soft Updates: A Solution to the Metadata Update Problem in File Systems", ACM Transactions Computer Systems, 18(2), p. 127-153, May 2000.
Ghemawat, S., et al., "The Google File System", Proceedings 19th ACM Symp. Operating Systems Principles, p. 29-43, New York 2003.

(Continued)

*Primary Examiner*—Cheryl Lewis
(74) *Attorney, Agent, or Firm*—Joseph Kolodka

(57) ABSTRACT

Information, such as files received from a client, etc., is stored in a storage system, such as a content addressable storage system. A file server receives data from a client and chunks the data into blocks of data. The file server also generates metadata for use in forming a data structure. The blocks of data are stored in a block store and a copy of the data blocks and the metadata are locally cached at the file server. A commit server retrieves the metadata. In at least one embodiment, the metadata is retrieved from an update log shared between the file server and the commit server. Based on the retrieved metadata, the commit server generates a version of a data structure. The data structure is then stored at the block store.

7 Claims, 5 Drawing Sheets

OTHER PUBLICATIONS

Hagmann, R., "Reimplementing the Cedar File System Using Logging and Group Commit", Proceedings 11th ACM Symp. Operating Systems Principles, p. 155-162, Nov. 1987.

Kubiatowicz, J., et al., "OceanStore: An Architecture for Global-Scale Persistant Storage", Proceedings 9th Int'l. Conf. ASPLOS, p. 190-202, Nov. 2000.

McKusick, M. K., et al., "A Fast File System for UNIX", Computer Systems, 2 (3), p. 181-197, 1984.

Muthitacharoen, A., et al., "A Low-Bandwidth Network File System", Proceedings 18th ACM Symp. Operating Systems Principles, p. 174-187, Oct. 2001.

Muthitacharoen, A., et al., "Ivy: A Read/Write Peer-to-Peer File System", Proceedings 5th USENIX Symp. OSDI, p. 31-44, Dec. 2002.

Quinlan, S., et al., "Venti: A New Approach to Archival Storage", Proceedings 1st USENIX Conf. FAST, Jan. 2002.

Rosenblum, M., et al., "The Design and Implementation of a Log-Structured File System", ACM Transactions on Computer Systems, 10(1), p. 26-52, Feb. 1992.

Schmuck, F., et al., "GPFS: A Shared-Disk File System for Large Computing Clusters", Proceedings 1st USENIX Conf. FAST, p. 231-244, Jan. 2002.

Sweeney, A., et al., "Scalability in the XFS File System", Proceedings USENIX Tech. Conf., p. 1-14, Jan. 1996.

Thekkath, C. A., et al., "Frangipani: A Scalable Distributed File System", Proceedings 16th ACM Symp. Operating Systems Principles, p. 224-237, 1997.

You, L. L., et al., "Deep Store: An Archival Storage System Architecture", Proceedings 21st ICDE, Apr. 2005.

\* cited by examiner

SYSTEM AND METHOD FOR CONTENT ADDRESSABLE STORAGE

BACKGROUND OF THE INVENTION

The present invention relates generally to content addressable storage and more particularly to improved access to data in content addressable storage systems.

Storing large quantities of data is critical to business. File systems must be backed up, volumes of records must be kept to satisfy regulatory requirements, and large collections of data must be stored, among other business applications. This important data must be stored in a manner that is resilient to hardware failure. Various systems have been employed which address the particular needs of each of these data collections.

Previously, content addressable storage (CAS) has been used for building high capacity storage systems. CAS systems generate an address for a block of data by hashing the data block contents. This allows duplicate copies of the data block to be readily identified so that the CAS system need only store one copy of the data block. The reduction in storage requirements makes CAS systems useful for high capacity storage.

However, since CAS typically store immutable objects, they only allow writing data organized in Directed Acyclic Graphs (DAGs). That is, once a parent block points to (e.g., contains the address on a child block, it is not possible for the child block to point to the parent block. Ignoring the sharing aspect in which a child is pointed to by many parents) these DAGs as may be informally referred to as "trees." Using CAS to implement a storage system that allows stored data to be modified (e.g., allows a file to be overwritten) presents two important challenges—(1) how to efficiently utilize the storage (e.g., minimize the use of parent blocks to point to a set of changing data/leaf/child blocks), and (2) how to allow concurrent modifications to different parts of the tree (e.g., avoid excessive locking) in order to offer better performance. Accordingly, improved systems and methods of storing and retrieving data in content addressable storage systems are required.

BRIEF SUMMARY OF THE INVENTION

The present invention generally provides systems and methods for storing information efficiently using an underlying content addressable storage. Information such as files received from a client, etc. is stored in a storage system such as a content addressable storage system. A file server receives data from a client (e.g., adding data to a file) and/or metadata operations, such as creating or removing a file. The data is grouped into data blocks that are stored in a data block storage of a block store. Since data write operations cause file system metadata modification, a commit server is used to write a new tree reflecting the new metadata. In at least one embodiment, the file server logs the operations that must be executed by the commit server to an update log. The update log is obtained by the commit server and operations described in it are applied to its current image of the file system, resulting in new metadata blocks (e.g., comprising a new file system version) which are written to the data block store Each operation from the update log is associated with a timestamp that is used to indicate to the commit server the order in which the operations must be applied, as well as for allowing the file server to clean its cached data through a cleaning process.

In at least one embodiment, the most recent version of the tree is used to update the local data and metadata cached at the file server. The file server retrieves the root block (e.g., the superblock) of the tree, which has an associated timestamp indicative of the most recent updates to the tree (e.g., the last operation from the update log that was applied). Based on the timestamp of the root block of the most recent version of the storage tree, outdated versions of metadata objects in the metadata cache are discarded and, in some embodiments, replaced with updated versions from the tree in the block store.

These and other advantages of the invention will be apparent to those of ordinary skill in the art by reference to the following detailed description and the accompanying drawings.

DETAILED DESCRIPTION

Figure 1:
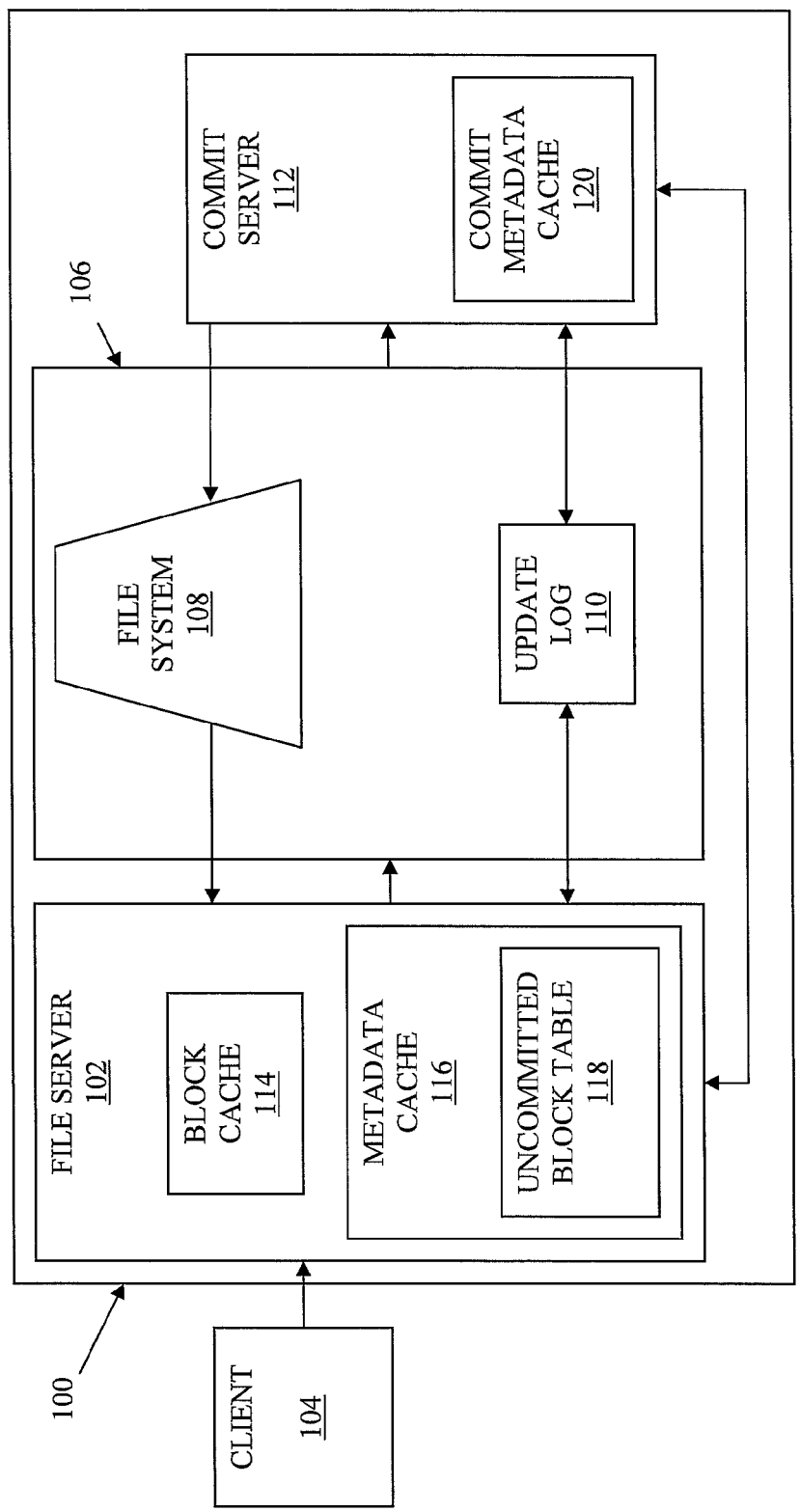
FIG. 1 is a diagram of a storage system according to an embodiment of the invention.

Combining a conventional content addressable storage system (CAS) with a file system front end (e.g., a data input) allows high throughput reads and writes of large files, whose data is stored efficiently and resiliently. FIG. 1 depicts an embodiment of such a combination. A storage system 100 is constructed using an underlying CAS as a block store 106. The storage system 100 has an interface, such as file server 102, that allows receipt, creation, and/or modification of data (e.g., write to a file.) or metadata operations (e.g., inserting a new file in a directory, changing the permissions on a file, etc.). The data from the file server 102 is written to the block store 106. A commit server 112 is used to apply operations received from the file server and write data blocks representing file system metadata to the block store 106 separately from and without regard to the file server 102 interface. In this way, writing data to the storage by the file server 102 and writing metadata to the storage by the commit server 112 is performed asynchronously, facilitating efficient high throughput reads and writes of large files.

FIG. 1 is a diagram of a storage system 100 according to an embodiment of the present invention. Storage system 100 comprises a file server 102 for receiving data operations (e.g., file writes, file reads, etc.) and metadata operations (e.g., file remove, etc.) from a client 104 and chunking the received data into data blocks to be stored in block store 106, and sending to the commit server 112 a list of operations to be applied to metadata. Block store 106 stores data blocks, some of which might point to other data blocks, and which can be organized in a file system 108, described in further detail below with respect to FIG. 2. Block store 106 further comprises an update log 110 for storing a log containing operations that must be applied by the commit server 112 to create file system 108. Metadata is any data that is not file content. For example, metadata may be information about one or more files viewable by a client, such as a file or directory name, a file creation time, file size, file permissions, etc., and/or information about one or more files and/or a file system not viewable by a client, such as indexing structures, etc. Of course, other appropriate metadata (e.g., information about data, one or more files, one or more data blocks, one or more data structures, one or more file systems, bitmaps, etc.) may be used. Update log 110 may comprise records describing operations that must be applied by the commit server. Such information is temporary information necessary for operation of file system 108, as is known. For example, after the file server 112 writes a data block to the block store 106, it sends the update log 110 the content address of the data block together with information describing a file that the data is part of and at which offset the data is placed, as well as a timestamp, discussed in further detail below.

File server 102 may be any computer or other device coupled to a client 104 and configured to provide a location for temporary storage of data (e.g., information, documents, files, etc.). Accordingly, file server 102 may have storage and/or memory including a block cache 114 for caching data blocks stored in data block store 106, a metadata cache 116 for caching metadata information (e.g., filenames created recently). A distinguished component of the metadata cache 116 is the uncommitted block table 118, which is used to store content addresses of data blocks recently written by the file server 102.

Additionally, file server 102 chunks data received from client 104 into data blocks (e.g., generates data blocks) and writes the data blocks to block cache 114. That is, file server 102 creates data blocks from the client data and/or otherwise groups data in a manner to allow for storage in a CAS and writes these data blocks to the block store 106. The block store 106 may recognize the data block as a previously seen (e.g., known, stored, etc.) data block and return its content address or may recognize the data block as a new block, generate a content address for it, and return the content address. File server 102 applies modifications to its cached metadata in the metadata cache 116 as it processes file operations (e.g., write operations from client 104). Generated data blocks are written to data block store 106 as quickly as possible, since only after completion of the write can the data block be evicted from block cache 114. Content addresses, which may be received together with a confirmation that the write has been completed, can be used to re-fetch a data block evicted from the block cache 114. The write operation is added to the update log 110 together with the content addresses of all the data blocks comprising the written data as well as with the timestamp of the operation. Until the file server 102 receives from commit server 112 a superblock (discussed below with respect to FIG. 2) with a timestamp equal to or higher than this timestamp, the content addresses of the data blocks are kept in the uncommitted block table 118. Uncommitted block table 118 stores content addresses for data blocks stored in data block store 106, but not yet represented in a version of file system 108 (e.g., the data block's address information has not been written by commit server 112 to file system 108 as described below with respect to method 300). Until a new version of file system 108 is created by processing the update log record containing its content address, a data block is not accessible on the file server 102 using the old version of file system 108. By utilizing the uncommitted block table, the content address for a data block may be readily found and the data block may be fetched if requested by client 104. Once a version of file system 108 containing a data block's metadata is written to block store 106, and notification is received by the file server 102, the corresponding content address may be removed from uncommitted block table 118.

Block store 106 may be a CAS system or other appropriate memory and/or storage system. In at least one embodiment, block store 106 is a cluster-based content addressable block storage system as described in U.S. patent application Ser. No. 12/023,133, filed Jan. 31, 2008, and U.S. patent application Ser. No. 12/023,141, filed Jan. 31, 2008, each incorporated herein by reference. Of course, other address based storage systems may be utilized.

Block store 106 contains data blocks that can be organized as a file system 108. File system 108 is a data structure that emulates a tree structure and is discussed in further detail below with respect to FIG. 2. Block store 106 may also include an update log to facilitate writing metadata to the file system 108 as will be discussed in further detail below with respect to FIG. 3 and method 300.

Commit server 112 may have similar structure as file server 102, but may be used for updating the metadata of file system 108. Commit server 112 processes operations received from the file server 102 (e.g., creation of a file with a specific name in a specific directory, inserting the content address corresponding to a write to a specific file at a specific offset, etc.). All operations from the update log 110 are associated with a timestamp; the commit server 112 applies the operations in monotonically non-decreasing order. Commit server 112 includes a commit metadata cache 120 for storing metadata prior to generating a new version of file system 108. Similar to metadata cache 116, commit metadata cache 120 stores metadata and/or data block information such as content addresses of data blocks stored in data block store 106. Periodically (e.g., at predetermined intervals, when commit metadata cache 120 achieves a certain usage level, etc.), batches of metadata and/or data block information are used to generate a new version of file system 108. Commit server 112 then stores the new version of the file system 108 at block store 106 and cleans commit metadata cache 120.

File server 102 and commit server 112 communicate by exchanging log records (e.g., describing an operation to create a file with a given name in a specified directory, etc.) and other control messages. In some embodiments, log records may be transmitted directly between file server 102 and commit server 112. In the same or alternative embodiments, log records may be written to and/or retrieved from update log 110, which may be stored at block store 106 or another location. Commit server 112 operates such that there is always a current version of file system 108. That is, commit server 112 processes log records (e.g., from update log 110) deterministically to generate a new version of file system 108.

Storage system 100 may have a processor (not shown) that controls the overall operation of the storage system 100 by executing computer program instructions that define such operation. The computer program instructions may be stored in a storage device (e.g., magnetic disk, database, etc.) and/or loaded into a memory when execution of the computer program instructions is desired. Thus, applications for performing the herein-described method steps and associated functions of storage system 100, such as data storage, data block generation, file read and/or write operations, etc., in methods 300 and 500 are defined by the computer program instructions stored in the memory and controlled by the processor executing the computer program instructions. Storage system 100 may include one or more central processing units, read only memory (ROM) devices and/or random access memory (RAM) devices. One skilled in the art will recognize that an implementation of an actual content addressable storage system could contain other components as well, and that the storage system 100 of FIG. 1 is a high level representation of some of the components of such a storage system for illustrative purposes.

According to some embodiments of the present invention, instructions of a program (e.g., controller software) may be read into file server 102, block store 106 and/or commit server 112, such as from a ROM device to a RAM device or from a LAN adapter to a RAM device. Execution of sequences of the instructions in the program may cause the storage system 100 to perform one or more of the method steps described herein, such as those described above with respect to methods 300 and 500. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The block store 106 may store the software for the storage system 100, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

Figure 2:
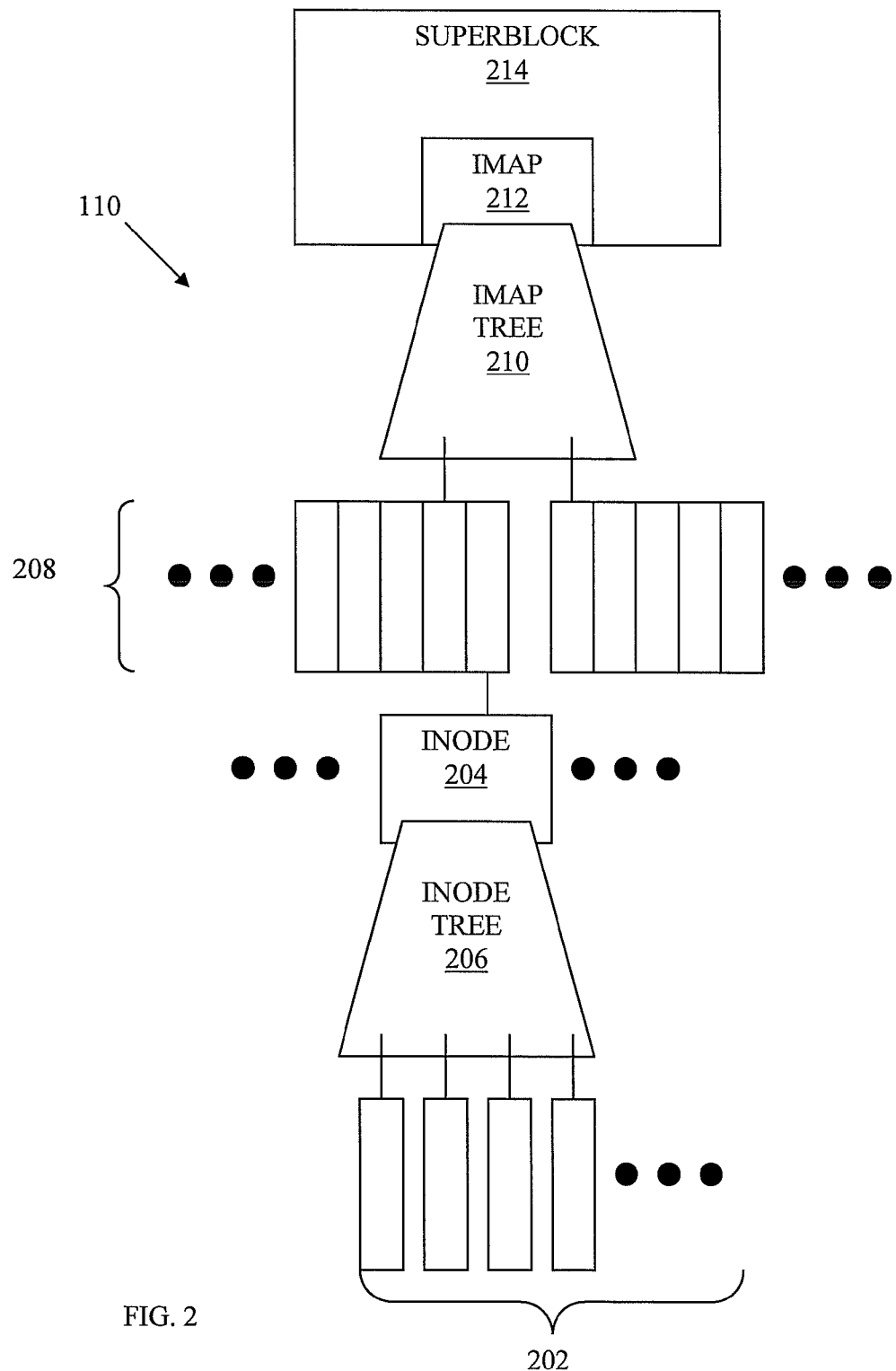
FIG. 2 is a diagram of a file system according to an embodiment of the invention.

FIG. 2 depicts a file system 108 according to an embodiment of the present invention. File system 108 is used in conjunction with and/or a part of block store 106 of storage system 100 of FIG. 1. File system 108 is a data structure embodied in a memory that emulates a tree structure. In at least one embodiment, file system 108 has a storage tree that represents data in a manner allowing efficient insertion, retrieval, and removal of information (e.g., metadata, addresses, content addresses, etc.). In at least one embodiment, file system 108 uses a B+ tree as is known for the organization of the imap and each inode, though any appropriate tree or other data structure may be used.

In the same or alternative embodiments, file system 108 has a Unix-like structure where files, directories, and/or symbolic links, such as data blocks 202 (e.g., data blocks received from file server 102 as described above) and/or associated information, are represented by inodes 204. Inodes 204 are themselves data structures in the Unix-like structure that store basic information (e.g., metadata, content addresses, etc.) about data, files, other data structures, or the like. Inodes 204 are root blocks of inode trees 206. Inode trees 206 may be B+ trees and provide mapping to data blocks 202 using the addresses of data blocks 202. This accommodates large files from client 104 with variable sized data blocks 202.

In turn, each of inodes 204 is indexed by an individual inode number in an imap block 208 that is part of an imap tree 210. The imap tree 210 is itself a data structure, such as a B+ tree, with a root block that is imap 212. Since there is no automatic mapping between inode numbers and the addresses of data blocks 202, the imap 212 facilitates translation therebetween. This may be similar to a log-structured file system or other appropriate file system. The imap 212 includes imap tree 210 and is an array of valid inode numbers and addresses of inodes 204, split into fixed-sized imap blocks 208 and indexed by the imap tree 210. Imap 212, as a mapping of inodes 204, keeps track of inode numbers that are in use and content addresses for the corresponding inodes 204. As the number of inodes increases, additional inode blocks 208 are added to imap 212 to store their content addresses. Any strategy of re-using inode numbers so as to avoid creating too large a data structure can be employed, such as is present in other Unix-like file systems.

The root of the imap tree 210—imap 212—is stored in a superblock 214. Superblock 214 is a block incorporating pointers to imap 212, parameters for file system 108, and a version number of file system 108. As will be discussed in further detail below, a new version of the file system 108 is created each time a new superblock is written such that file system 108 comprises multiple superblocks 214. That is, file system 108 has a superblock 214 for each version of file system 108 as written by commit server 112 of storage system 110. The latest superblock 214 can be used for retrieving the most up to date information. The other superblocks 214 can be used for retrieving "snapshots" of the file system as it existed in the past.

In operation, storage system 110 processes file writes (e.g., storing data blocks in block store 106) and metadata updates (e.g., storing a version of file system 108 in block store 106) asynchronously, similar to a disk-based file system. Instead of writing a new file system 108 version each time a data block is stored, the storage system 110 allows the file server 102 to utilize information from block cache 114 and/or metadata cache 116 immediately and write the new file system 108 to the block store 106 at a later time. In doing so, the storage system 110 may batch what would have been multiple updates of the file system 108 into a single file system 108 write by commit server 112. In addition to reducing time required to service individual read and/or write operations from client 104, this amortizes the cost of updating file system 108. Since writing a new version of file system 108 requires updating each block in inode tree 204 and thus imap tree 210 in addition to superblock 214, such a batching of updates reduces the number of times upper levels of the trees must be rewritten. Additionally, this allows each version of file system 108 to be timestamped or otherwise noted with a creation and/or update time. Such a timestamp allows clients 104 and/or storage system 100 to retrieve prior versions of the file system 108 and thus access prior versions of data blocks in data block store 106. Timestamps may be monotonically increasing. In some embodiments, timestamps are monotonically increasing and not based on real time.

Figure 3:
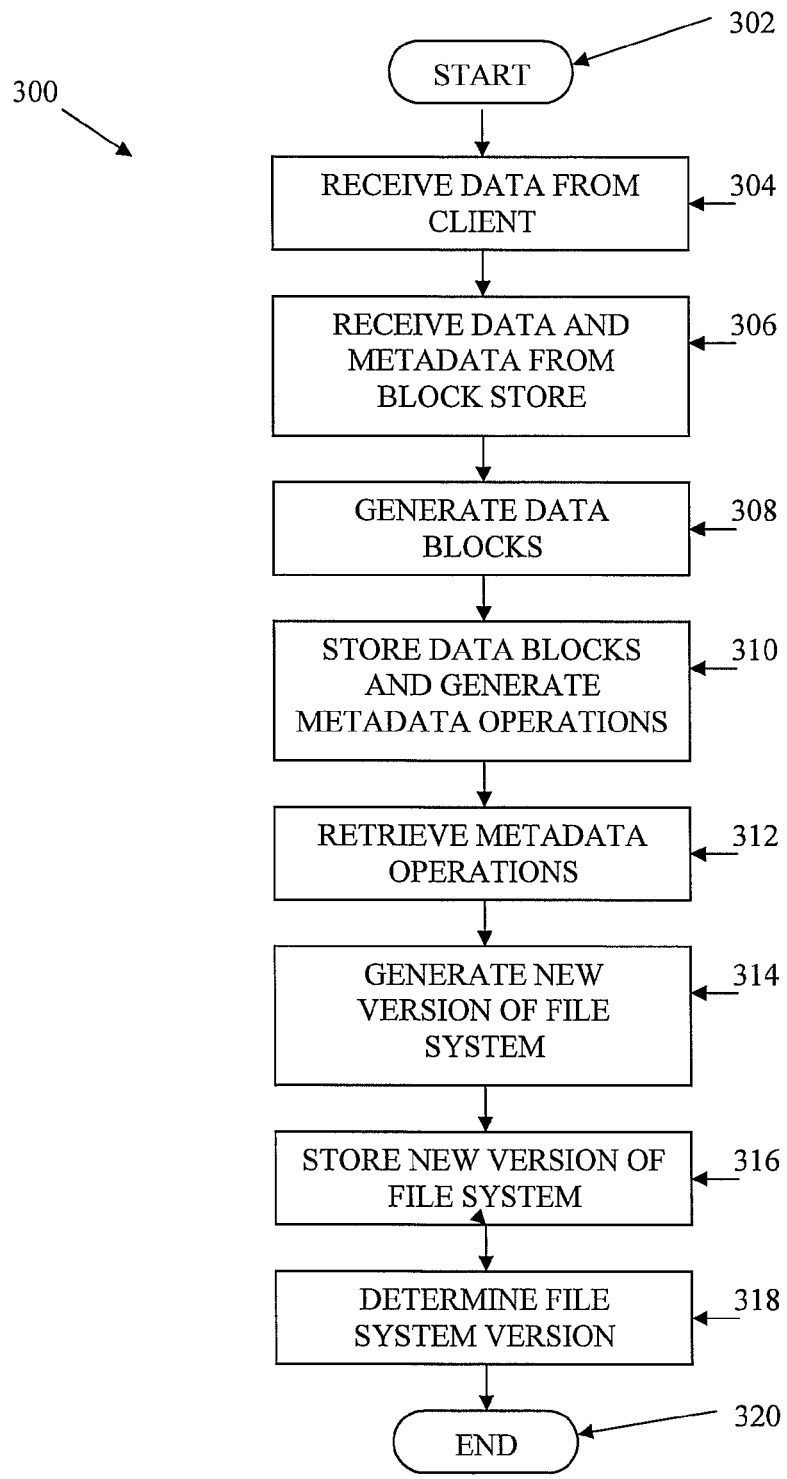
FIG. 3 depicts a flowchart of a method of storing information in a storage system.

FIG. 3 depicts a flowchart of a method 300 of storing information in storage system 100. The method steps of method 300 may be performed by the storage system 100. The method begins at step 302.

In step 304, data is received from client 104 at file server 102. In step 306, data and metadata is retrieved by the file server 102 from block store 106. The data may be one or more data blocks stored in data block store 106 in response to past operations on the file system. Data blocks may be fetched from block store 106 so they may be used to generate new blocks reflecting operations (e.g., overwriting a part of a file) required by the client 104. Metadata is comprised of mapping of file names to inodes using directories, file size information, file ownership information, etc. Additionally, the metadata may be information from the file system 108, such as data block content address that is not visible to the client 104.

In step 308, one or more data blocks are generated. Here, data from client 104 received in step 304 is chunked into data blocks by file server 102. Data blocks are generated by the file server 102 using conventional methods. That is, based on incoming data from the client 102, blocks of discrete amounts of data are created by the file server 102. Additionally, an address of the contents of each data block and other associated metadata is obtained by the file server 102 together with the write completion acknowledgement.

File server 102 accumulates data received from client 104 in step 304 in a buffer (not shown) associated with an inode 204 in file system 108. When a client 104 supplies the path to the file when it opens the file, the file server 102 uses this path to look up the inode 204 and retains it as context for subsequent operations on the file by the client 104. The boundary between blocks is found by examining the contents of the data received from the client 102 to find break points that increase the likelihood that writes of the same data will produce the same blocks. When a data block boundary is found, data stored in the buffer up to that point is used to generate a new data block. The data remaining in the buffer is used as all or a portion of a subsequent data block. In some embodiments, a global limit of the amount of data buffered is employed to limit memory consumption and prevent inode buffers from growing without bound.

File server 102 keeps the data blocks in block cache 114 until the block store 106 confirms the block write by returning the block's content address. Once the content address was received, the block can be evicted from the block cache 114 since it can be re-fetched by using the content address.

In step 310, data blocks are written in block store 106 and metadata operations are generated. As described above, file server 102 sends the generated blocks of data to block store 106. Any metadata operations related to data blocks that need to be modified as a result of the write (e.g., content addresses for the data blocks, etc.) is stored in metadata cache 116. All metadata operations are logged by the file server 102 to the update log 110. Metadata operations are instructions related to actions to be performed at blocks store 106 and/or at file system 108. For example, if a data block is to be deleted, the metadata operations are instructions to the commit server 112 to delete the data block (e.g., one of data blocks 202 in FIG. 2, etc.). Of course, any appropriate instructions or operations to be sent from the filer server 102 to the commit server 112 and/or the block store 106 may be considered as metadata operations.

Block store 106 confirms the storage of the data block(s) and a content address indicative of the data block is added to uncommitted block table 118 along with a timestamp, inode number, and byte ranges corresponding to the newly stored data block. The copy of the data block stored in block cache 114 is then marked as "clean." That is, the copy will then be marked as available for eviction (e.g., purge) from block cache 114.

In step 312, commit server 112 retrieves the metadata operations from the update log 110. In some embodiments, the update log 110 is stored on block store 106. In other embodiments, the commit server 112 retrieves the metadata operations directly from file server 102.

After the commit server 112 has retrieved a batch of metadata operations and/or content addresses, the commit server generates a version of file system 108 in step 314. That is, commit server 112 may store metadata indicative of multiple data blocks in commit metadata cache 120 until a predetermined amount of metadata is stored. The commit server 112 may then process all of the metadata operations stored in commit metadata cache 120 in a batch and may generate a new version of file system 108. In this way, commit server 112 reduces the number of times new versions of file system 108 must be generated.

Commit server may generate a new version of file system 108 from the bottom-up by first storing information about data blocks 202 in inode tree 204 of inode 206, and then progressing up the path to the root (e.g., superblock 214) through inode blocks 208 of imap tree 210 in imap 212 as is known. Finally, a root block—a new version of superblock 214—is generated, as well as a timestamp indicating the last log record that contributed to this version of file system 108. In this way, the metadata in each batch, and thus in each generated version of file system 108 is known and may be recalled by client 104 and/or storage system 100 as appropriate.

In step 316, the newly generated version of file system 108 is stored in block store 106. The new version of file system 108 replaces the prior version as the currently relevant version, but does not necessarily overwrite the prior version(s) of file system 108. In this way, prior versions of file system 108 may be accessed according to their respective timestamps. Thus, the address information of old data blocks may also be retrieved.

In step 318, the file server 102 access the file system 108 to determine the version and the timestamp of the file system 108. File server 102 may then use the timestamp to mark "dirty" metadata as "clean" in metadata cache 116. This information is used in conjunction with a metadata cleaning method 500 described below with respect to FIG. 5.

The method 300 ends at step 320. It should be understood that some of the method steps of method 300 may be performed substantially simultaneously. For example, file server 104 may receive data from client 104 in step 304 at substantially the same time as other data is used to generate data blocks in step 308. Similarly, data blocks may be stored at block store 106 in step 310 at substantially the same time as commit server 112 generates and stores a newer version of file system 108 at block store 106. In this way, storage system 100 may more quickly and efficiently update storage and address information.

Figure 4:
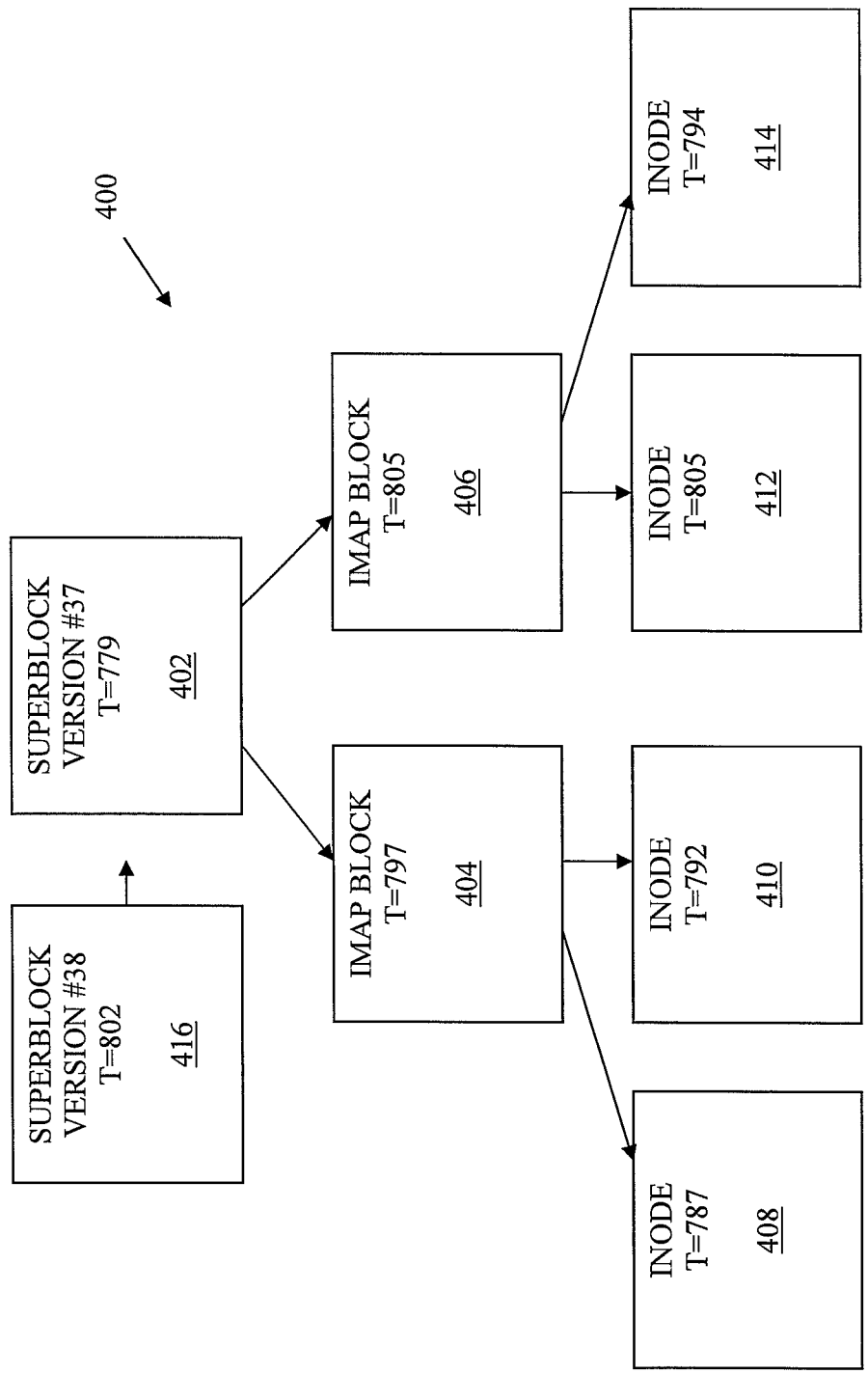
FIG. 4 depicts exemplary metadata tree according to an embodiment of the present invention.

FIG. 4 depicts exemplary metadata tree 400 as stored in metadata cache 116. Metadata tree 400 mirrors and is a data structure structurally similar to file system 108 in block store 106. In other words, metadata tree 400 is an alternative way of depicting the data structure of a file system as discussed throughout this application. Information contained in metadata tree 400 is a copy of metadata in file system 108 as retrieved in step 306 of method 300. The metadata objects 402-416 in FIG. 4 each have an associated timestamp. That is, each metadata object has an associated relative age that is a monotonic counter. The highest assigned counter number coordinates with the most recently assigned (e.g., newest) information. In this way, metadata objects with a higher counter number are considered to be newer or more recent than metadata objects with a lower counter number, which are considered to be older or less recent.

Metadata tree 400 includes a superblock 402. Superblock 402 is assigned a version number and an associated timestamp corresponding to the version and/or timestamp of a corresponding version of a file system 108 in block store 106 as discussed above with respect to FIG. 2. In the exemplary metadata tree 400, superblock 402 has a version number of 37 and an associated timestamp of 779.

Similarly to file system 108, metadata tree 400 has one or more imap blocks 404, 406. Imap blocks 404 and 406 have respective associated timestamps of 797 and 805. That is, the newest information in branches of the tree extending from imap blocks 404 and 406 is indicated by timestamps 797 and 805, respectively. Of course, superblock 402 may have any number of imap blocks depending from it.

Imap blocks 404 and 406 may each map to one or more inodes. For example, imap block 404 may map to inodes 408 and 410, each having a respective timestamp of 787 and 792. Similarly, imap block 406 may map to inodes 412 and 414, each having a respective timestamp of 805 and 794. Of course, any number of imap blocks and/or inodes may be used. Each object (inode, imap block, superblock, etc.) has a timestamp at least as new as the newest timestamp of any object depending from it in the metadata tree 400.

Metadata tree 400 may be updated by a new version of a superblock, such as superblock 416. Superblock 416 is assigned a version number and timestamp corresponding to the version and/or timestamp of a corresponding version of a file system 108 in block store 106 as discussed above with respect to FIG. 2. In the exemplary embodiment of FIG. 4, superblock 416 has a version number of 38 and a timestamp of 802. Accordingly, superblock 416 may be considered to be newer than superblock 402.

Metadata tree 400 is merely illustrative and is a simplified version of the data structures used in coordination with the storage system 100. Metadata tree 400 is presented as a straightforward branched tree for simplicity in describing the method steps of method 500.

Figure 5:
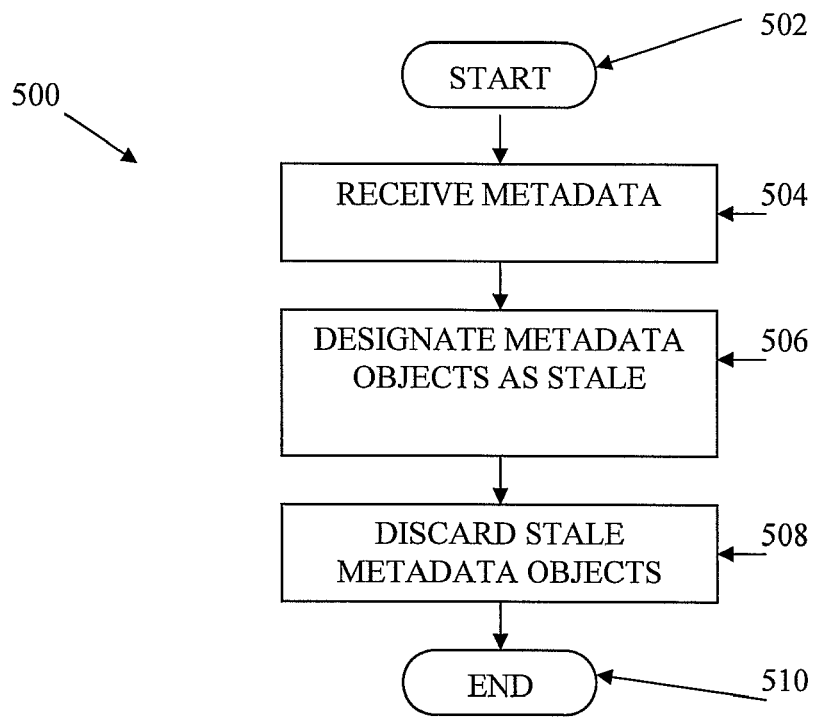
FIG. 5 depicts a flowchart of a method of maintaining metadata in a file server.

FIG. 5 depicts a flowchart of a method 500 of maintaining metadata in file server 102. Maintaining metadata in file server 102 may include maintaining a metadata tree, such as the metadata tree 400 of FIG. 4, in metadata cache 116. Method 500 may be considered a "cleaning" or updating of metadata cache 116.

Metadata objects (e.g., metadata objects 402-416) are designated as clean, dirty, or stale. Clean objects are objects retrieved from file system 108 in method step 306 of method 300 above without having ever been modified and may be discarded from metadata cache 116 at any time. Dirty objects are metadata objects with a timestamp greater than the most recent superblock's timestamp. Dirty objects may not be discarded. Parents of dirty objects (e.g., objects from which the dirty object depends) must be dirty. Stale objects are metadata objects with a timestamp less than the most recent superblock's timestamp. Stale objects may be discarded at any time. Stale objects may contain some current content addresses, though the file server must re-fetch a stale block from the block store 106 if it is to use one of the content addresses stored in the block. The new and updated version of the stale block may have a different content address, generated by the commit server 112 when writing the updated block's children. Parents of stale objects may be stale or dirty and may have other dirty children.

Method 500 begins at step 502.

In step 504, metadata operations are received at metadata cache 116. Such metadata operations may include a new version of a superblock, such as superblock 416 of FIG. 4. The new version of the superblock is based on a bottom up write of file system 108 by commit server 112. Commit server 112 processes this metadata in batches according to timestamp order. The commit server 112 generates a superblock (e.g., root block) timestamp for the batch that is the timestamp of the newest piece of metadata in the batch. The commit server 112 writes the modified blocks in file system 108 from the bottom up according to the tree of file system 108 as discussed above. The superblock of file system 108 is necessarily the last block written and is passed to the metadata cache 116 at an appropriate time (e.g., when fetched).

In step 506, metadata objects are designated as stale, as appropriate based on the timestamp of the received superblock. That is, any dirty metadata objects with a timestamp that is older than the received superblock's timestamp is designated as stale.

In the exemplary embodiment of FIG. 4, imap blocks 404 and 406 and inodes 408-414 are all initially dirty since their timestamps are newer than (e.g., greater than) the timestamp initial superblock 402. Accordingly, when the superblock 416 is received with a timestamp of 802, imap block 404 is designated as stale because it has an older (e.g., smaller) timestamp (797) than superblock 416. Similarly, inodes 408, 410, and 414 are also designated as stale because their timestamps are also older than the timestamp of superblock 416.

In step 508, stale metadata objects are discarded. Stale metadata objects are discarded from the top down according to the metadata tree (e.g., metadata tree 400). Discarding stale metadata objects from the top down ensures that a discarded object is not re-fetched from file system 108 using an out of data content address from its stale parent. As a result, a stale child cannot be discarded without first discarding its parent. Metadata objects are accordingly discarded according to the chain of tree dependencies. In the exemplary metadata tree 400, the superblock 402 is discarded first, followed by imap blocks 404 and 406, and finally inodes 408-414.

In the exemplary embodiment of FIG. 4, imap block 404 and its children inodes 408 and 410 are stale and are discarded. Inode 414 is also stale as determined in step 506, but cannot be discarded because its parent, imap block 406 is not stale.

In some embodiments, discarded metadata objects are replaced. Such a replacement is optional. For example, after removing a file from a directory, no further operations are performed on that directory. Hence, it is not necessary to continue to store that directory. Discarded metadata objects are replaced with versions from the file system 108. In the exemplary embodiment of FIG. 4, newer versions of imap block 404 and inodes 408 and 410 corresponding to superblock 406 are retrieved from file system 108 and stored in metadata cache 116.

The method 500 ends at step 510.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of storing information in a storage system comprising:

chunking data into one or more blocks of data with a file server;

generating metadata operations of a file system with the file server;

storing the one or more blocks of data in a block store;

retrieving the metadata operations with a commit server;

generating a data structure based on the metadata operations and the one or more blocks of data with the commit server;

storing the data structure in the block store, storing the metadata operations in an update log; and wherein retrieving the metadata operations with the commit server comprises retrieving the metadata operations from the update log;

wherein chunking data into one or more blocks of data and generating metadata operations with the file server further comprises associating a timestamp with the generated metadata operations and comprising:

storing the generated metadata operations at the file server; and cleaning the metadata stored at the file server with the metadata stored as a version of the data structure based at least in part on the one or more timestamps associated with the retrieved metadata operations.

2. The method of claim 1 wherein storing the one or more blocks of data in the block store and storing the data structure in the block store occur substantially simultaneously.

3. The method of claim 1 further comprising:

receiving data from a client at the file server; and wherein chunking data into one or more blocks of data with the file server comprises separating the data received from the client into the one or more blocks of data.

4. A system for storing data comprising:

a file server configured to chunk data into blocks of data and generate metadata operations;

a memory configured to store the blocks of data;

a commit server configured for retrieving the metadata operations, generating a data structure indicative of the metadata operations, storing store the data structure in the memory, storing the data structure in the block store, and storing the metadata operations in an update log; and wherein retrieving the metadata operations with the commit server comprises retrieving the metadata operations from the update log;

wherein chunking data into one or more blocks of data and generating metadata operations with the file server further comprises associating a timestamp with the generated metadata operations and comprising:

storing the generated metadata operations at the file server; and cleaning the metadata stored at the file server with the metadata stored as a version of the data structure based at least in part on the one or more timestamps associated with the retrieved metadata operations.

5. The system of claim 4 further comprising:

an update log configured to receive the metadata operations from the file server and pass the metadata operations to the commit server.

6. A method of storing information in a storage system comprising:

chunking data into one or more blocks of data with a file server;

generating metadata operations of a file system with the file server;

storing the one or more blocks of data in a block store;

retrieving the metadata operations with a commit server;

generating a data structure based on the metadata operations and the one or more blocks of data with the commit server;

storing the data structure in the block store, and storing the metadata operations in an update log; and wherein retrieving the metadata operations with the commit server comprises retrieving the metadata operations from the update log;

wherein generating the data structure comprising the metadata with the commit server comprises:

retrieving one or more timestamps associated with the retrieved metadata operations;

modifying metadata in a metadata cache based on the retrieved metadata operations;

batching the metadata operations; and storing the metadata as a version of the data structure based at least in part on the one or more timestamps associated with the retrieved metadata.

7. A system for storing data comprising:

a file server configured to chunk data into blocks of data and generate metadata operations;

a memory configured to store the blocks of data;

a commit server configured for retrieving the metadata operations, generating a data structure indicative of the metadata operations, storing the data structure in the memory, storing the data structure in the block store, and storing the metadata operations in an update log; and wherein generating the data structure comprising the metadata with the commit server comprises:

retrieving one or more timestamps associated with the retrieved metadata operations;

modifying metadata in a metadata cache based on the retrieved metadata operations;

batching the metadata operations; and storing the metadata as a version of the data structure based at least in part on the one or more timestamps associated with the retrieved metadata.

* * * * *